W. J. KENT.
RUBBER TIRED WHEEL.
APPLICATION FILED JUNE 4, 1913.

1,115,548.

Patented Nov. 3, 1914.

WITNESSES:
René Bruine
Fred Lohit

INVENTOR :
William J. Kent,
By Attorneys,
Fraser, Turk & Myers

UNITED STATES PATENT OFFICE.

WILLIAM J. KENT, OF NEW YORK, N. Y., ASSIGNOR TO REVERE RUBBER COMPANY, OF CHELSEA, MASSACHUSETTS, A CORPORATION OF RHODE ISLAND.

RUBBER-TIRED WHEEL.

1,115,548.  Specification of Letters Patent.  Patented Nov. 3, 1914.

Application filed June 4, 1913. Serial No. 771,648.

*To all whom it may concern:*

Be it known that I, WILLIAM J. KENT, a citizen of the United States, residing in the borough of Brooklyn, county of Kings, city and State of New York, have invented certain new and useful Improvements in Rubber-Tired Wheels, of which the following is a specification.

This invention relates to means for fastening rubber tires to the rims or fellies of vehicle wheels.

It relates particularly to those tires which are held to the channel by two wires which engage side flanges on the tire, the wires coming just inside the flanges of the channel.

The object of the invention is to provide an improved fastening means which will diminish the tendency of the tire to creep or crawl upon the channel.

Figure 1:
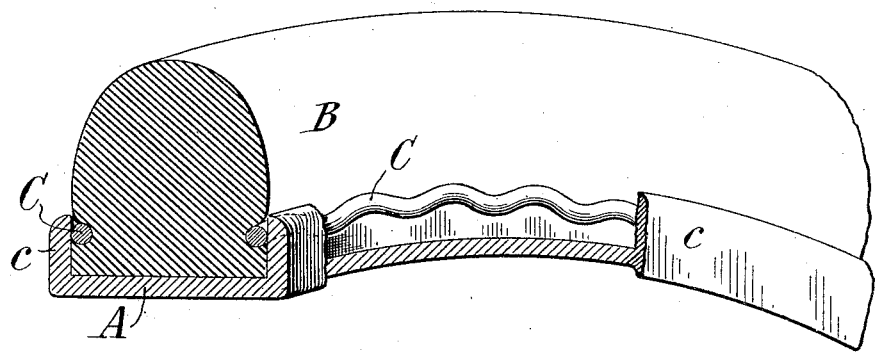
Figure 2:
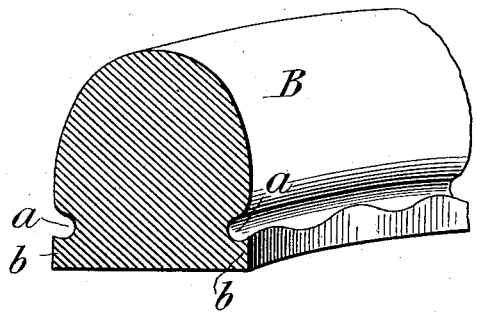
Figure 3:
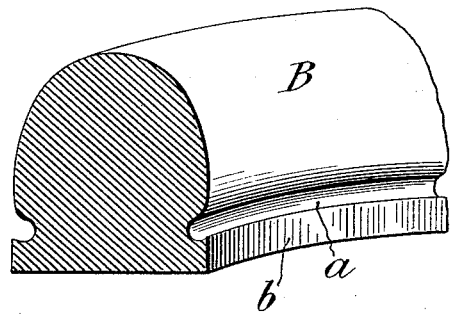
Figure 4:

Figure 1 of the accompanying drawings is a fragmentary sectional perspective view showing the preferred construction; Figs. 2 and 3 are fragmentary sections of the tire showing two different constructions; Fig. 4 is an elevation of a fragment of one of the fastening wires.

In the drawings, A is the wheel rim or channel, which fits around the felly, B is the rubber tire, and C C are the fastening wires. The tire has the usual grooves or depressions $a$ $a$ for receiving the wires, whereby is formed beneath these the usual flanges $b$ $b$ which are engaged by the wires and by which the tire is held seated in the channel. The wires are within the side flanges $c$ $c$ of the channel, so that they are prevented from escaping laterally. As thus far described the construction is already known. In the known construction the wires are simply straight wires bent to a circle of the required size, their ends being united by brazing or otherwise fastened.

A defect of the construction heretofore used is that the tire is liable to creep or crawl around the channel. As such tires are made in long lengths and bent around the tire with their ends abutted, such creeping frequently results in their abutting ends separating so as to leave a gap. My invention is designed to remedy these disadvantages.

The fastening wires C C are according to my invention made sinuous or corrugated as shown. When the wires are drawn tightly into place the corrugation on the inner sides bite into the flanges $b$ of the tire and unite them so intimately as to practically suppress any creeping of the tire, since the tire is precluded from circumferential displacement relatively to the wires, and hence is held almost positively against such displacement relatively to the channel. The tire may be molded with its grooves $a$ made sinuous, as shown in Fig. 2, so that the flanges $b$ have a rising and falling contour, or being of varying thickness so as to interlock with the corrugations of the wires. This construction is preferably where the flange portion of the tire is made of extremely dense composition, or is so stiffened by fabric as to be more nearly incompressible than the remaining portion of the tire. Or the tire may be made with its flanges of uniform thickness as heretofore, this construction being shown in Fig. 3; in this case the flanges should be of sufficiently soft or yielding composition to enable the wires when put under tension to sink into the rubber and thereby indent it sufficiently to attain the same result.

In applying the tire the fastening wires are drawn down with great force so as to hold the tire flanges with the necessary firmness and generate a strong frictional adhesion between the tire and channel. The result is that the tire is so intimately seated to the channel, and so strongly held by the corrugated wires, that it is ideally restrained against crawling.

An incidental advantage is that the corrugation of the wires imparts to them a slight elasticity which, considering the stiffness of the wires, is not sufficient to diminish their hold upon the tire flanges, but is sufficient to diminish the tendency of the wires to break under strain, and hence the liability of the tire becoming unfastened is diminished.

My invention is not to be limited to the precise construction and proportions illustrated, as it is susceptible of a certain degree of modification or variation according to the purpose for which it is to be used, and the result desired for the mechanical structure in any given instance.

I claim as my invention:—

1. The combination of a channel, a rubber tire seated therein, and fastening wires engaging side flanges on the tire and entering between flanges on the channel, said wires being corrugated or sinuous, so as to engage the tire flanges yieldingly and sink into such flanges.

2. A vehicle wheel comprising a channel, a rubber tire having side flanges, and resilient side wires exterior to the tire and engaging its side flanges, said wires of sinuous contour and drawn tightly against the tire flanges so as to sink into such flanges.

In witness whereof, I have hereunto signed my name in the presence of two subscribing witnesses.

WILLIAM J. KENT.

Witnesses:
ARTHUR C. FRASER,
FRED WHITE.

Copies of this patent may be obtained for five cents each, by addressing the "Commissioner of Patents, Washington, D. C."